Aug. 31, 1926.
R. C. LIVESAY
SHEAF CARRIER
Filed August 1, 1924
1,597,986
4 Sheets—Sheet 4
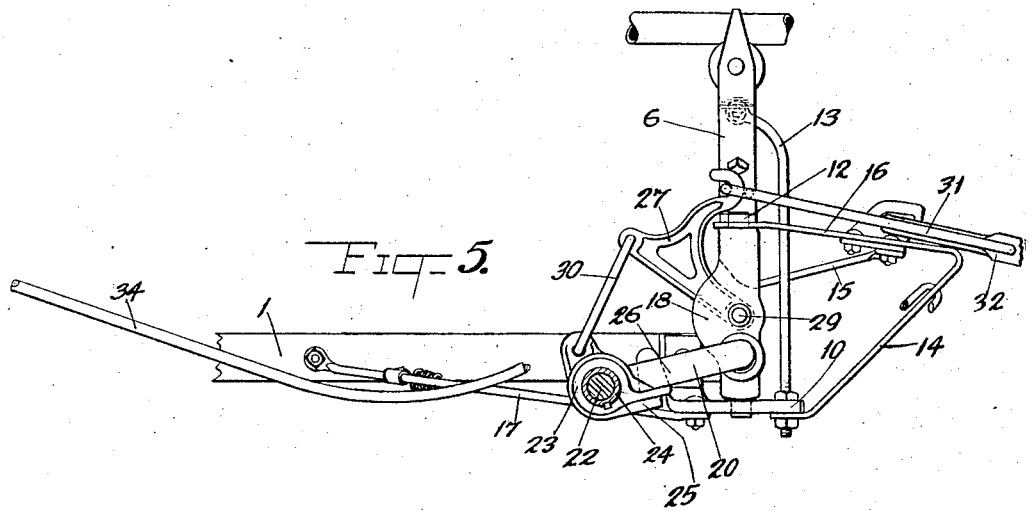
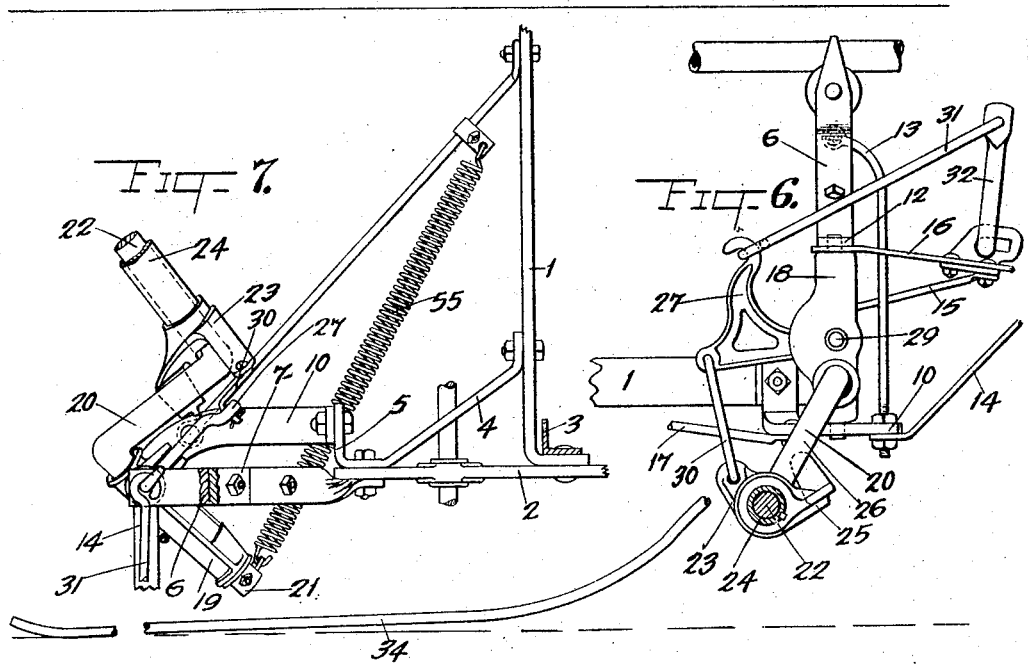

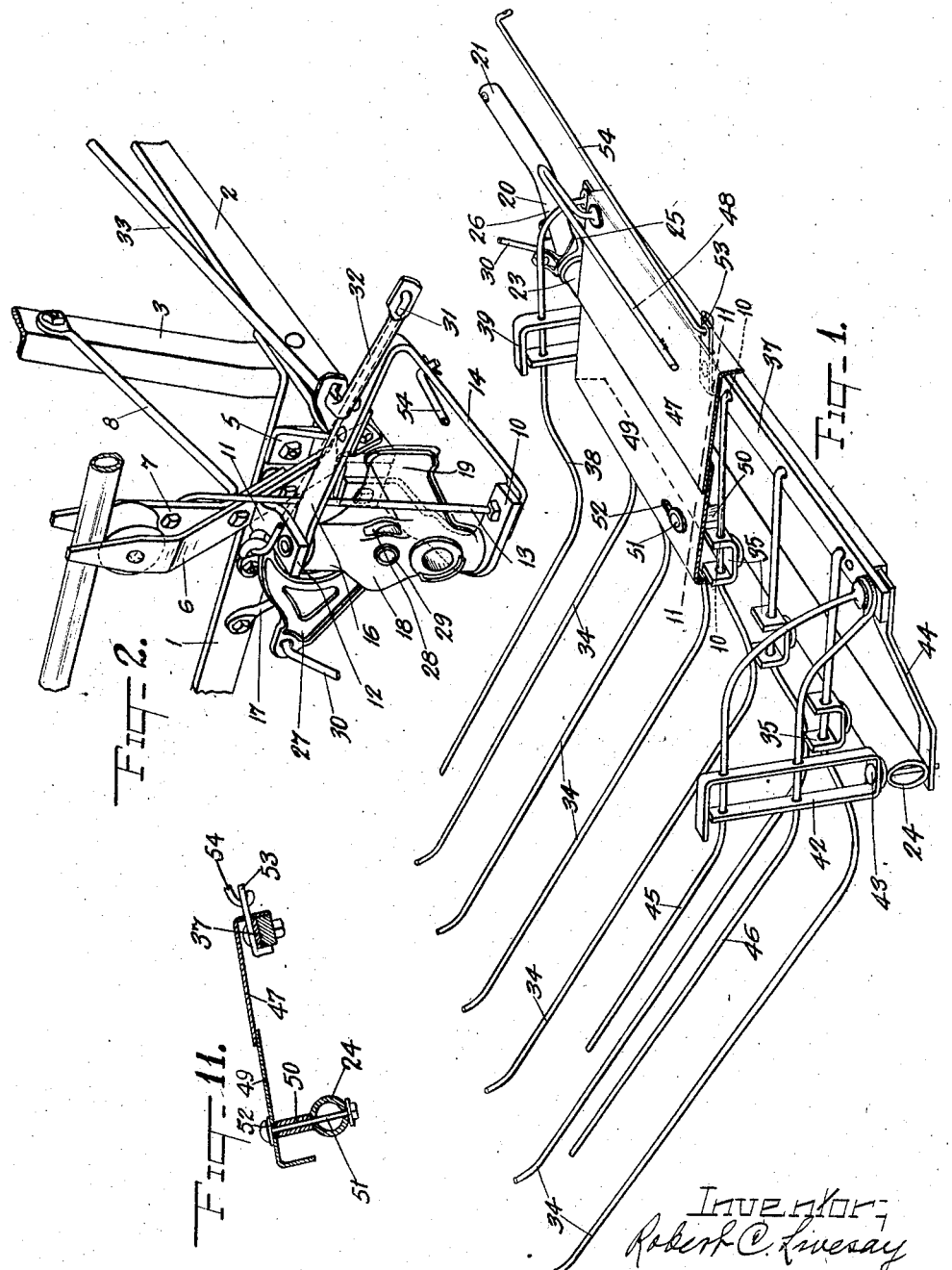

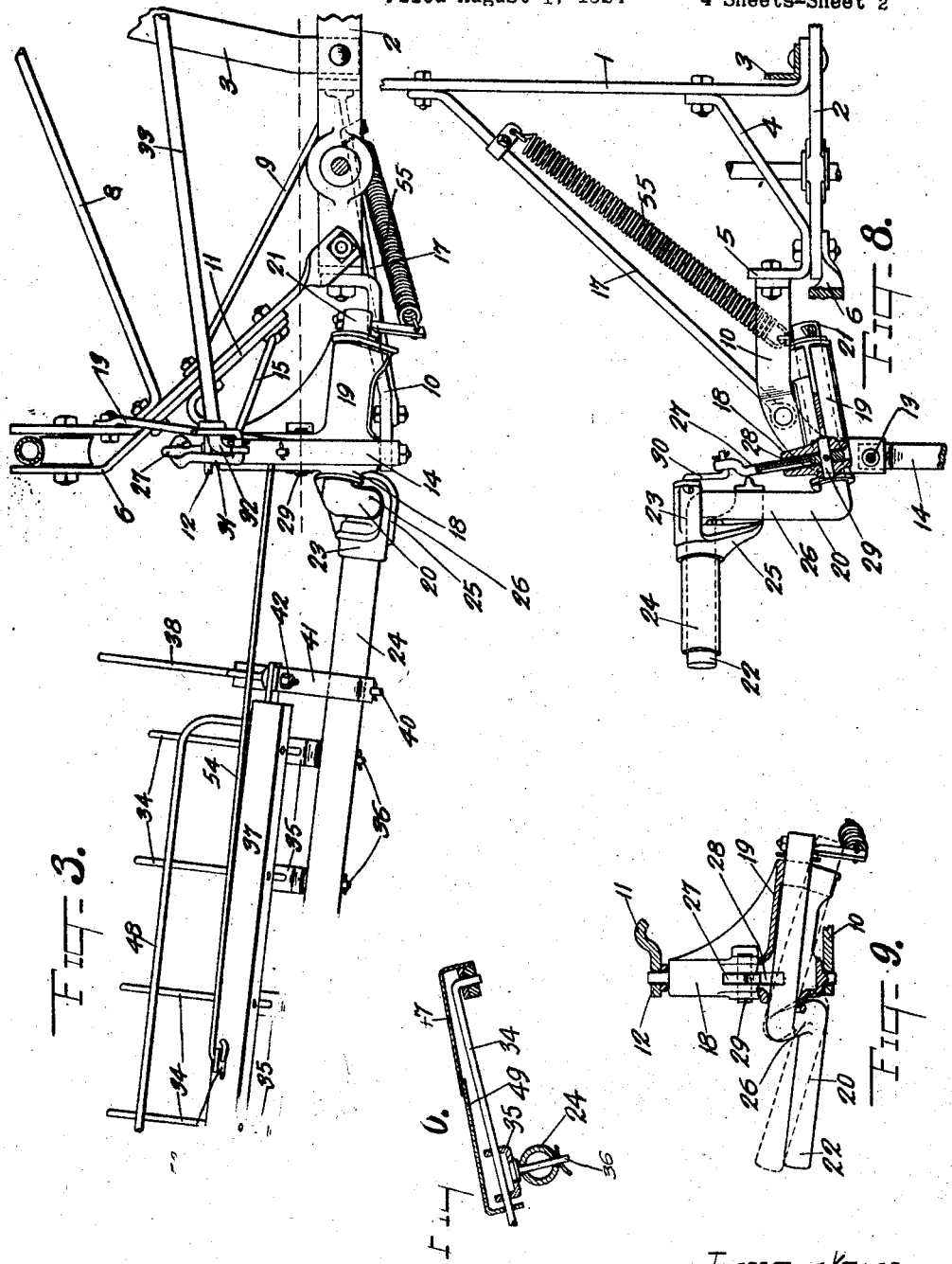

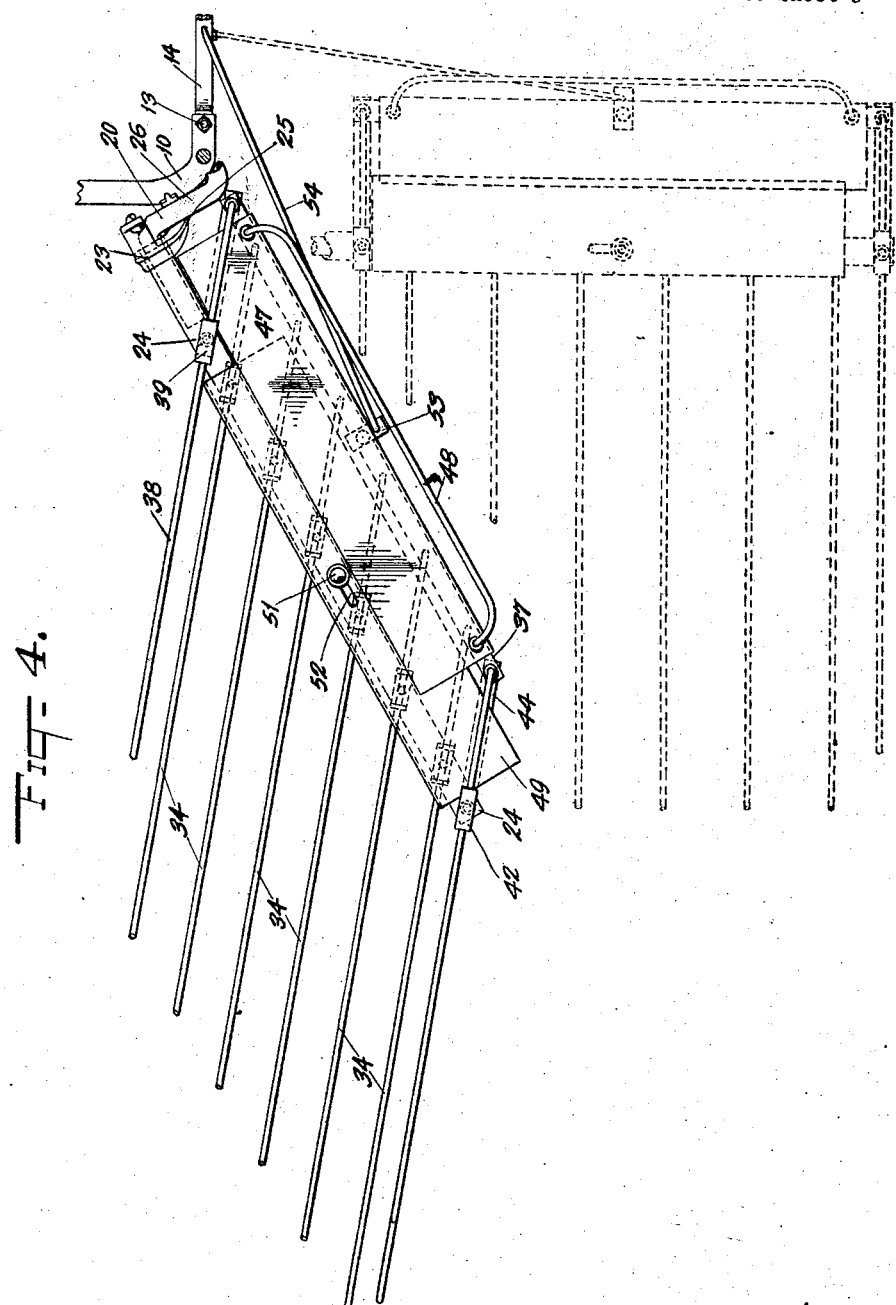

Patented Aug. 31, 1926.

1,597,986

UNITED STATES PATENT OFFICE.

ROBERT C. LIVESAY, OF MOLINE, ILLINOIS, ASSIGNOR TO DEERE & COMPANY, OF MOLINE, ILLINOIS, A CORPORATION OF ILLINOIS.

SHEAF CARRIER.

Application filed August 1, 1924. Serial No. 729,473.

My invention relates to sheaf carriers for harvesters and binders, optionally controllable and adapted to swing toward and under the binder by pressure of contact with an obstacle in its path. The object of my invention is to so mount and support the carrier on the harvester by certain pivotally arranged parts by the operation of which the carrier retains its full height above the ground when swung to a folded position.

Referring to the drawings in which similar numerals indicate identical parts—

Figure 1 is a perspective view of my improved carrier dismounted and ready to be attached to the supporting and operating mechanism shown in Figure 2. Figure 2 is a perspective view of the supporting and operating mechanism of the carrier. Figure 3 is a front elevation of the carrier mounted and partly broken away. Figure 4 shows the carrier in folded position, dotted lines indicating its receiving position. Figure 5 illustrates the position of the parts when the carrier is raised, the view being taken from the stubbleward side. Figure 6 is a detail of the operating mechanism and the position of the parts when the carrier is down. Figure 7 is a detail plan of the parts of the operating mechanism illustrating their position when the carrier is folded. Figure 8 is a detail plan, in part section, of the operating mechanism with the carrier raised. Figure 9 is a detail front view, in part section, of the carrier supporting parts. Figure 10 is a detail section, on the line 10—10 of Figure 1, illustrating the carrier tine mounting, and Figure 11 is a detail section on the line 11—11 of Figure 1.

Sheaf carriers of this type and their attachment to a harvester are well known in the art, and because of the fact it is considered sufficient of a harvester is shown in the drawings to illustrate the mounting and operation of my improved device. The side bar 1, the front bar 2, and a vertical bar 3 of a harvester frame are rigidly bolted together, and extending diagonally from the bar 1, to which it is rigidly secured, is a brace 4 bolted to the bar 2 and having its stubbleward end 5 bent rearwardly. Extending upwardly from the frame bar 2, to which it is bolted, is a bar 6 with a bar 7 secured thereon, the upper portions of the bars 6 and 7 being vertical and parallel and spaced apart to admit a roller between them utilized in adjusting the binding mechanism fore and aft. A brace 8 is secured to the bars 6 and 7 and to the bar 3 of the harvester frame, and a brace 9 extends between the frame bar 2 and the bars 6 and 7 to which it is rigidly attached.

Bolted to the frame bar 1 is a bar 10 projecting stubbleward and bent in a forward curve. To the bar 6 is secured a bar 11 terminating in a part 12 parallel with the bar 10. A vertical brace rod 13 extends from the end portion of the bar 10 to the bar 7 and is fastened to both by suitable nuts. Extending forwardly is a member 14, fastened preferably to the underside of the bar 10 and bent upwardly and forwardly therefrom and then bent upon itself rearwardly to the part 12 of the bar 11, and is braced firmly by a rod 15 secured to the bar 11 and to the upper part 16 of the member. The bar 10 is further braced by a rod 17 secured thereto and to the frame bar 1. The parts heretofore enumerated constitute the rigid support for the carrier and the movable parts connected therewith; the bars 12 and 13 and the member 14 forming a bracket upon which the carrier and its operative parts are directly supported.

A vertically disposed member 18 is pivotally supported between the bar 10 and the part 12 of the bar 11 by spindles on the ends of the member 18, which socket respectively in a suitable opening in the bar 10 and in the rearward end of the part 16 of the member 14 and in the part 12 of the bar 11. Preferably integral with the member 18 is a horizontally disposed sleeve 19 normally at a right angle to the line of draft and open beneath longitudinally; a crank 20 has one of its arms 21 journaled in the sleeve 19, and upon its second arm 22 is rockably mounted a casting 23, rigidly attached to a pipe bar 24, having an arm 25, preferably integral therewith, projecting beneath the intermediate part 26 of the crank 20 and turned upwardly on the inner side thereof. A bell crank 27 is rockably mounted, in a recess 28 in the member 18, on a pin or bolt 29, and is connected to the casting 23 by a link 30 hooked in an eye in a lug on the casting and a similar eye in the bell crank. Having hooked engagement with the upper angle of the bell crank is a link 31, which, in Figure 2, is shown partly in dotted lines; the link 31 extends forwardly to connection with an arm 32 integral with a rod 33 extending to the harvester seat bar, not shown, and operated in a manner well known in the art. The connection of the link 31 to the arm 32 is below the axis of the rod 33, when the carrier is in a raised position, consequently the carrier is held locked from dropping until the rod 33 is actuated to swing the arm 32 upwardly.

The carrier fingers or tines 34 are supported by bibrachiate parts 35, each having a spindle 36 which projects rotatably through suitable holes in the pipe 24 and is secured on the under side thereof by a pin or cotter. The tines 34 are loosely held in openings in the arms of the parts 35, through which they are passed and extend forwardly to a bar 37 provided with suitable holes for reception of the bent ends of the tines and in which they are pivotally secured. The tines 34 are curved downwardly, in a rearward direction from the parts 35, for part of their length, and are then straightened until near their ends which have a slight upward bend. When the carrier is in a receptive position, the tines 34 have an upward inclination rearwardly to retain, to better advantage, the sheaves dropped from the harvester, but in depositing the sheaves upon the ground the straightened part of the tines is parallel with the surface.

To prevent sheaves from falling from the sides of the carrier, I employ guard tines above the level of the tines 34, one of which 38, is located on the side of the carrier adjacent the harvester and is carried in a vertical support 39, formed of a flat bar bent to a rectangular form, pivotally secured on the pipe 24 by a bolt 40 extending through the pipe bar 24 and secured in place by a cotter. From the support 39, forwardly, the tine 38 is bent downwardly to the bar 37 and extends therethrough and through one end of a bar 41 where it is secured by a nut 42; the bar 41 is also attached to the pipe 24 by the bolt 40, holding the rectangular body in place, and is the support for the inner end of the bar 37. A rectangular support 42 is pivotally mounted on the stubbleward end of the pipe by a bolt 43 which projects through the pipe bar 24 and through a bar 44, of the same length as the bar 41, and is attached to the stubbleward end of the bar 37 by an end of a guard tine 45 which passes through an eye in the forward end of a guard tine 46, and through the bars 37 and 44, and is secured by a nut, not shown. The guard tines 45 and 46 are bent to extend rearwardly through the support, one above the other, after which they are bent to parallelism with the tines 34.

On the front part of the carrier is a table formed of two sections of sheet metal and operating as a cover for the forward portions of the tines 34 to prevent accumulation of weeds and similar trash thereon. The forward section 47 is rigidly attached to the bar 37 by the ends of a guard rail 48 which are bent to pass therethrough into the bar 37, and the rear section 49, which is overlapped by the section 47, is supported on a stud 50 by a bolt 51 which extends through a washer and through a slot 52 into the pipe bar 24 where it is secured; the section 49, rearwardly, is bent downwardly and the bent portion is supported on the tines 34 which extend loosely through holes therein. Fastened to the bar 37, and projecting forwardly through a slot in the section 47, is a strap 53 in which is hooked an end of a link 54 having its opposite end fastened to the member 14 in the plane of the axis of the member 18.

An operator, in dumping the carrier, actuates the rod 33 to rock the arm 32 upwardly and rearwardly to break the lock holding the carrier raised so that the latter will be free to drop to the ground and deposit its load; as the carrier falls the bell crank 27 rocks downwardly on its pivot 29 on the member 18 and at the same time the crank 20 turns downwardly and forwardly. In raising the carrier, the rod 33 is actuated and the bell crank 27 is rocked upwardly simultaneously, turning the crank 20 and raising the carrier to the receiving position which is assured by the contact of the arm 25, of the casting 23, with the part 26 of the crank.

As before stated, the carrier folds toward the harvester when it meets an obstruction, and one of the purposes of my invention is to cause it to fold as compactly as possible without raising or lowering it from its receptive position, and I accomplish this by constructing and arranging the movable supporting parts of the carrier so that the pivot of the crank 20 on the member 18, the pivot of the bell crank 27 thereon and the connection of the link 31 to the bell crank are all substantially in the same vertical plane, consequently the carrier is neither raised or lowered in its swing toward the harvester, and after the obstruction is passed, the carrier is returned to its receptive position by the tension of a spring 55 fastened rearwardly to the brace 17 and connected to the inner end of the arm 21 of the crank 20.

The pipe bar 24 and the bar 37 are parallel and connected by the bars 41 and 44, they have a relative longitudinal movement when the carrier is folded toward the harvester, and when it is returned to its receiving position. The sections 47 and 49 of the table also have a longitudinal movement in accord with the movements of the pipe bar 24 and the bar 37 on which they are respectively mounted. The section 47 is rigidly secured to the bar 37, but the section 49 has a movement, longitudinal of the pipe bar 24, caused by the swing of the fingers when the carrier is folded or returned to its normal position; the section 49 is secured to the stud 50 on the pipe bar 24 by the bolt 51; the bolt 51 extends through a slot 52 in the section 49 to allow a longitudinal movement of the latter as the carrier is folded.

What I claim is—

1. The combination with a harvester frame, of a bracket mounted on the frame, a member supported on the bracket and turnable on a vertical axis, a horizontal bearing in said member, a crank element having an arm journaled in said bearing and rockable about an axis in the plane of the axis of said member, a rearward arm on said element, a sheaf carrier rockably supported on the rearward arm, a bell crank pivotally supported on said member and rockable about an axis in the plane of the axis of said member, means connecting the rearward arm and the bell crank, and means on the harvester attached to said bell crank at a point substantially in the plane of the axis of said member and operative at will to rock the latter whereby the carrier is lowered or raised.

2. The combination with a harvester frame, of a vertically disposed member pivotally supported thereon and turnable about a vertical axis, a bearing in said member normally disposed transversely of the line of draft, a crank having an arm turnably journaled in said bearing with its axis in the vertical plane of the axis of said member, a rearward arm on said crank parallel to the first mentioned arm, a sheaf carrier rockably supported on said rearward arm in normal receiving position and foldable toward the harvester, a bell crank rockably supported on said member on an axis in the plane of the axis of said member and parallel to the axis of the crank arm journaled in said member, a link connected to the rearward arm of the crank and to the bell crank, a link attached to said bell crank, the point of attachment thereof being substantially in alinement with the axis of said member, when the sheaf carrier is in receiving position or folded toward the harvester, and extending forwardly to connection with means, mounted on the harvester, operable at will to rock said bell crank and lower or raise the sheaf carrier.

3. The combination with a harvester frame, of a sheaf carrier pivotally supported thereon, means to hold the carrier in a receptive position and adapted to yield to permit the carrier to fold rearwardly toward the harvester, and a table having two sections mounted transversely on the carrier and movable longitudinally relative to each other in opposite directions when the carrier folds toward the harvester or returns therefrom to its normal receiving position.

4. The combination with a harvester frame, of a sheaf carrier pivotally supported thereon, means to hold the carrier in a receptive position and adapted to yield to permit the carrier to fold rearwardly toward the harvester, a table having two sections mounted transversely on the carrier, one section overlapping the other section, and both sections movable longitudinally relative to each other in opposite directions when the carrier folds toward the harvester or returns therefrom to its normal receiving position.

5. The combination with a harvester frame of a sheaf carrier pivotally supported thereon, means to hold the carrier in a receptive position and adapted to yield to permit the carrier to fold rearwardly toward the harvester, a table having a forward section and a rear section mounted transversely on the forward part of the carrier, the forward section overlapping the rear section, and both sections movable longitudinally relative to each other in opposite directions when the carrier folds toward the harvester or returns therefrom to its normal receiving position.

ROBERT C. LIVESAY.